Figure 6:
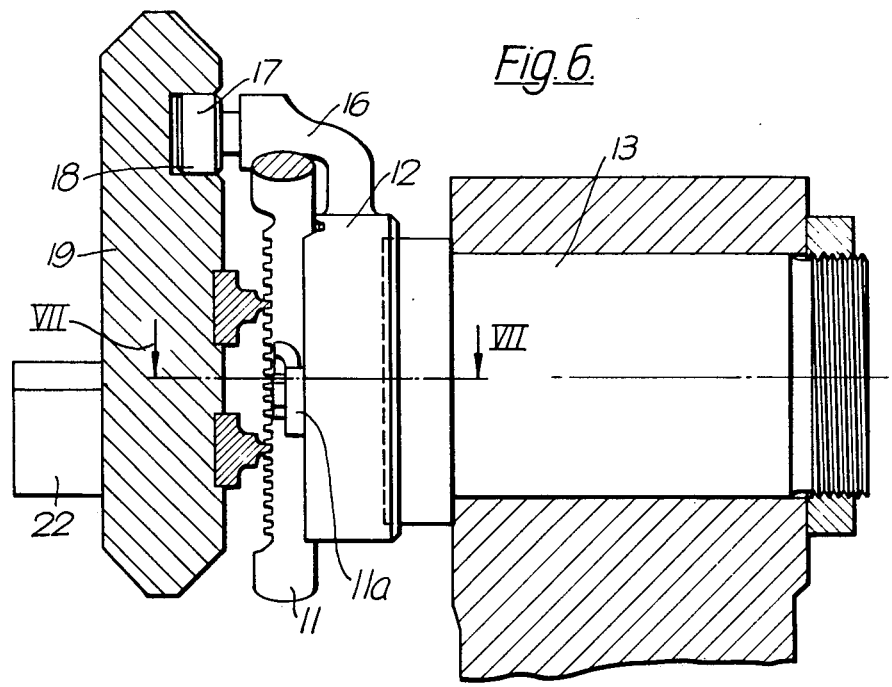
Figure 7:
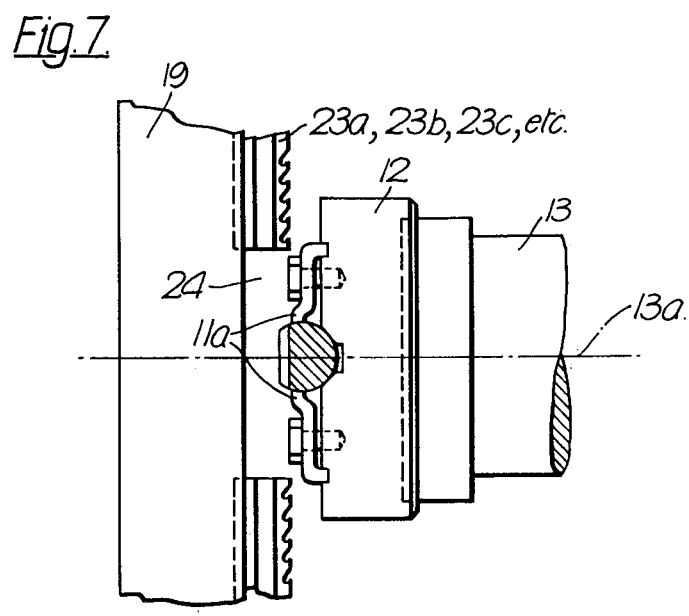

United States Patent [19]

Bishop

[11] 4,193,722

[45] Mar. 18, 1980

[54] MACHINE FOR MANUFACTURING VARIABLE RATIO RACKS

[76] Inventor: Arthur E. Bishop, 17 Burton St., Mosman, N. S. W. 2088, Australia

[21] Appl. No.: 881,911

[22] Filed: Feb. 27, 1978

[30] Foreign Application Priority Data

Feb. 28, 1977 [AU] Australia .............................. PC9216

[51] Int. Cl.² .......................... B23D 37/06; B23F 1/08
[52] U.S. Cl. ...................................... 409/59; 409/268; 409/272
[58] Field of Search .................. 90/10, 63, 80, 82, 83, 90/88; 269/57; 74/422

[56] References Cited

U.S. PATENT DOCUMENTS

| | | | |
|---|---|---|---|
| 1,022,625 | 4/1912 | Fawcus | 90/10 |
| 1,468,393 | 9/1923 | Perkins et al. | 90/83 X |
| 1,907,000 | 5/1933 | Parr | 90/10 |
| 2,039,480 | 5/1936 | Floeter | 90/80 X |
| 2,102,071 | 12/1937 | Hart | 90/10 |
| 2,177,147 | 10/1939 | Mattson | 90/82 X |
| 2,255,221 | 9/1941 | LaPointe | 90/82 X |
| 2,270,741 | 1/1942 | Rovick | 90/82 X |
| 2,838,980 | 6/1958 | Babock | 90/83 X |
| 2,850,950 | 9/1958 | Poynter | 90/83 |
| 3,753,378 | 8/1973 | Bishop | 74/422 |

*Primary Examiner*—Horace M. Culver
*Attorney, Agent, or Firm*—Hill, Van Santen, Steadman, Chiara & Simpson

[57] ABSTRACT

A machine for the manufacture of variable ratio racks such as are used in the steering gear of cars, the machine having a plurality of pairs of broaching blades and a holding fixture for holding at least one rack blank so that it can be indexed about a central point of the rack. The machine is arranged so that as either the broach blades are moved past the rack blank or the rack blank is moved past the broach blades pairs of corresponding teeth on each side of the center line are formed simultaneously, the rack blank being indexed to an angle to suit the angle of inclination of a pair of teeth about to be cut to the longitudinal axis of the rack. The machine produces a rack blank in which pairs of teeth of different form and different angular inclination are formed to a shape closely approximating the final shape of the teeth which is achieved by an additional step such as pressing or machining.

3 Claims, 7 Drawing Figures

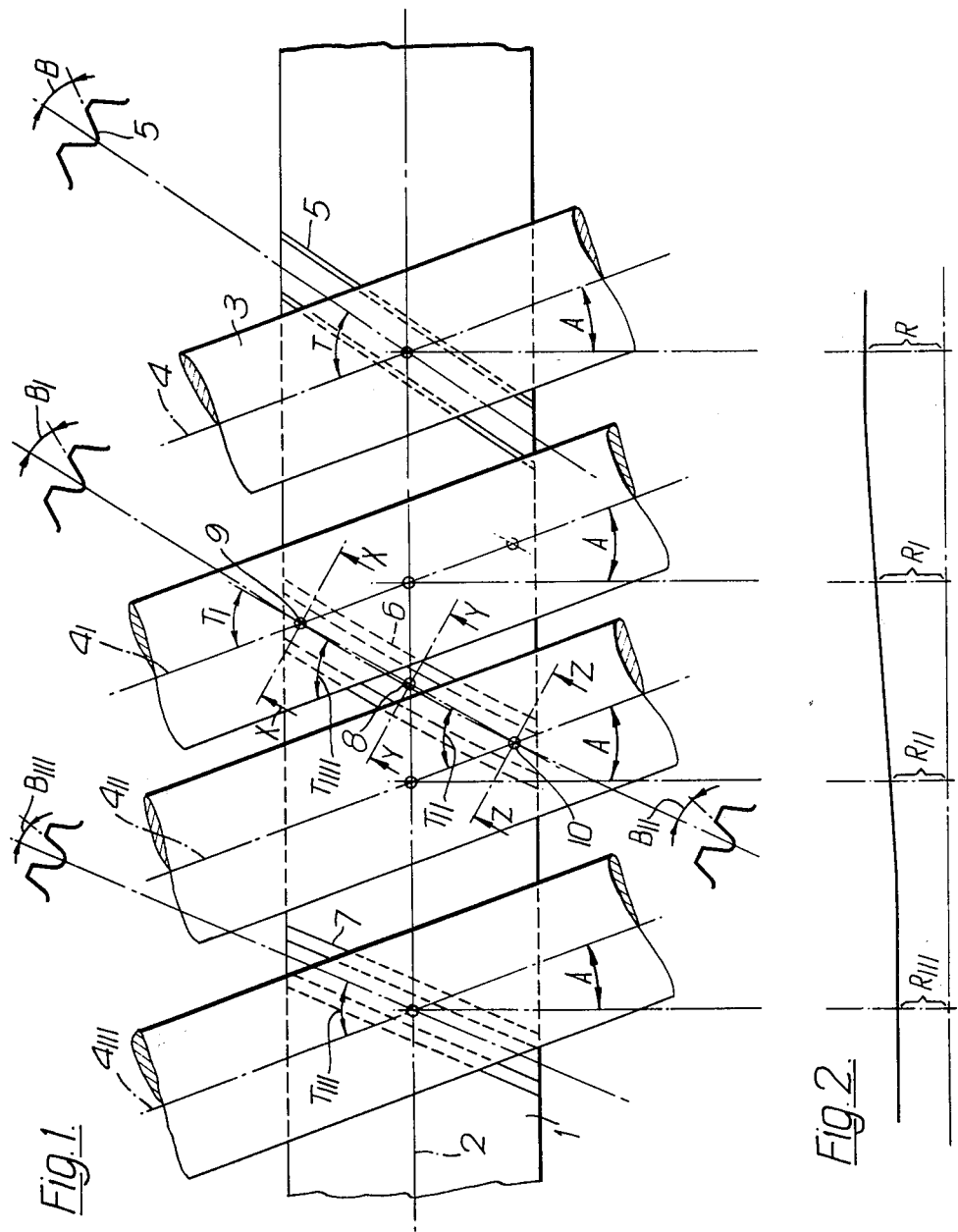

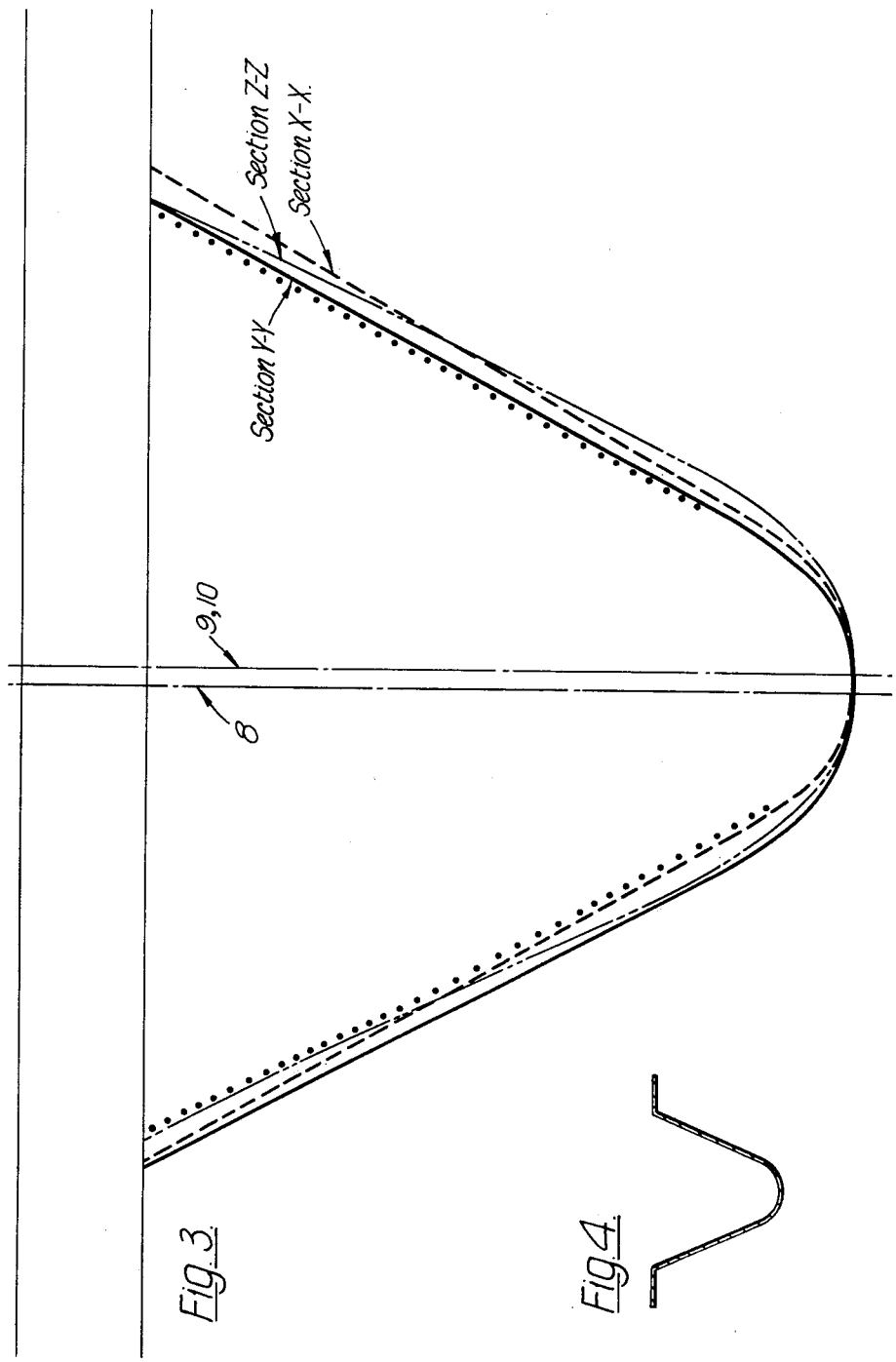

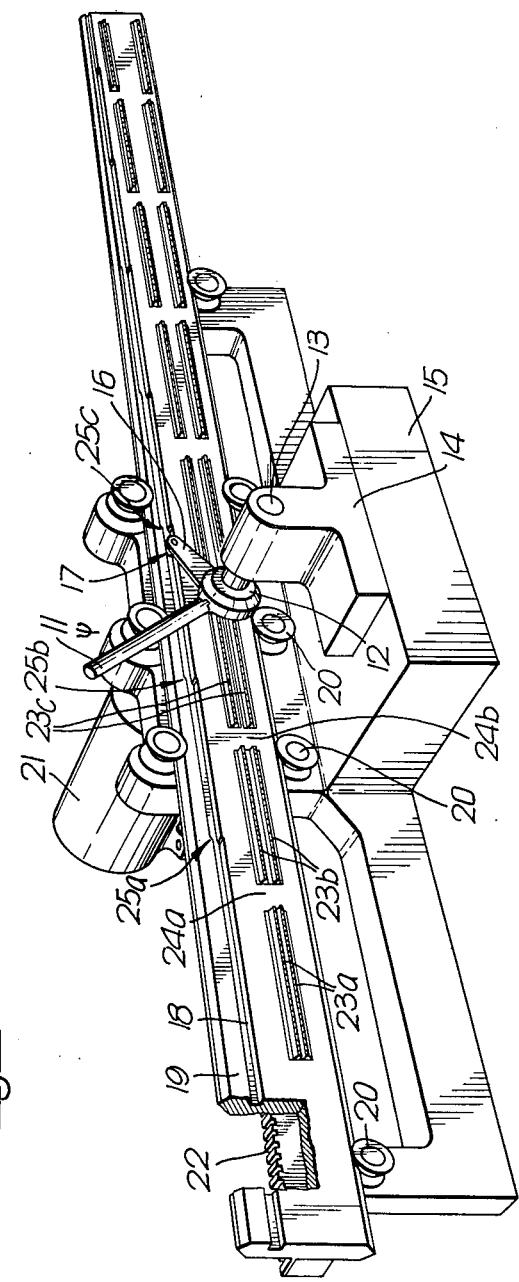

MACHINE FOR MANUFACTURING VARIABLE RATIO RACKS

This invention relates to a machine for the manufacture of variable ratio racks such as are used in the steering gear of cars. In such steering gears a pinion secured to the steering shaft meshes with a rack the ends of which are linked by tie-rods to the two front wheels.

Hitherto such racks were always of constant pitch, providing a uniform ratio. However there are advantages in using a variable pitch in the rack teeth, so providing a variable ratio, as described in U.S. Pat. No. 3,753,378.

As referred to in that specification, two ratio patterns are useful, depending on whether the steering gear is of the power or manual type. In power steering, it is best to have a few centre teeth with a small pitch providing a high steering ratio for straight-ahead driving, smoothly blending to a group of teeth each side of centre having a large pitch providing a low numerical ratio for cornering. One advantage claimed for this arrangement was that the majority of teeth each side of the centre teeth are of constant form and pitch, and can be made by conventional broaching methods. A method was described for generating the unique, variable-ratio teeth employing a reciprocable cutter having a form which was a facsimile of the pinion. It was however admitted that the process was inefficient, and therefore should be applied only to the few centre teeth. The machine now to be described would provide an efficient means for the manufacture of such power steering racks.

Now in the case of manual steering, the desirable pattern differs considerably from that useful in power steering, in that a low ratio is required on centre, with the ratio increasing smoothly all the way from the centre to each lock. Thus the ratio pattern should follow the increase in steering effort in rack and pinion steered cars due to the decrease of mechanical advantage in the linkage as each steered wheel is turned from centre to each lock. In such racks most of the teeth need to be of a unique, variable-ratio form, so that few teeth can be finished by broaching.

Furthermore the pinions used in manual steering gears are generally of small diameter, have a steep helix, and are set at an angle to the rack axis to achieve a worm-like action in driving the rack, and so provides a high reduction ratio. It is not practical to make a cutter which is a facsimile of such a pinion. Therefore, for two reasons, the facsimile method of generating variable ratio racks for manual steering gear is impractical.

A purpose of the present invention is to provide a machine for cutting teeth in the racks of such variable ratio steering gears in an efficient and reproducible manner, of forms so closely approximating the correct forms that they can, in a subsequent finishing stage, be deformed or otherwise shaped to the exact forms or profiles.

This invention thus consists in a machine for manufacturing variable ratio steering gear backs having teeth in two groups arranged symmetrically about a central point on the rack, said machine comprising a base, a holding fixture to hold at least one rack blank indexable about an axis passing at right angles to the longitudinal axis of the rack blank through said central point of a rack blank held in said fixture, a broach carrying member, a plurality of pairs of broach blades spaced apart at length along said broach carrying member, means for producing relative movement between said broach carrying member and said holding fixture, said pairs of blades being arranged to cut sequentially pairs of corresponding teeth of said groups of teeth simultaneously on the occurrence of said relative movement, means to hold said holding fixture correctly indexed during the cutting of teeth, means to index said holding fixture about said axis after each pair of corresponding teeth has been cut preparatory to the cutting of a succeeding pair of teeth.

The design of tools used in cutting pre-finished tooth forms requires that the exact geometry of each tooth be determined both in respect to the working flanks and the root areas, and for all sections along the length of each tooth. As will be explained, each tooth is shaped differently from each other tooth, and its form will be different at all sections along its length.

By careful design, the amount of variation in any one tooth can be kept small, so that a mean shape can be determined which varied from the correct shape only by a few thousandths of an inch.

It will be evident, however, that this pre-forming process is far more than a mere roughing process, in that the finishing processes referred to above are capable of correcting only very minor errors, and hence large errors in the preforming stage cannot be tolerated.

In order that the invention may be better understood and put into practice a preferred form thereof is hereinafter described, by way of example, with reference to the accompanying drawings in which:

FIG. 1 is a diagrammatic plan view of a portion of a variable ratio rack with which a pinion is engaged, showing four successive positions of the pinion, FIG. II is a diagram illustrating the variation of the effective radius R, as the pinion rotates in a left turn, FIG. III is an enlarged end view of tooth gap 6 of FIG. 1 showing secions of the tooth gap on lines XX, YY and ZZ, FIG. IV is an end view of an approximation to tooth gap 6 suitable for forming by broaching, FIG. V is a general view of a machine constructed according to the present invention for manufacturing variable ratio racks by broaching, FIG. VI is a sectional view on a part of the machine of FIG. V in a vertical plane passing through the axis of the spindle 13 and FIG. VII is a sectional view on line VII—VII of FIG. 6.

Before describing a preferred form of the invention it is desirable to discuss considerations relating to the design of the teeth of a variable ratio rack for a steering gear.

Referring to FIGS. 1 and II the relative position of the rack and pinion applies to a right hand drive car in which the pinion is located, in plan view, above the rack, and the steering assembly is located behind the front wheels. In the centered condition of the steering gear, the pinion axis is indicated as 4; successive relative positions $4_I$, $4_{II}$ and $4_{III}$ of the pinion in a left turn are shown, for convenience, as though the pinion was displaced to the left rather than as though the rack moved to the right. In all positions the pinion is inclined at the same angle A to the normal to the rack axis.

In the on-centre position it is effected that the steering ratio be low, and hence that the effective radius R of the pinion be large. Referring now to FIG. II, this is a plot showing the variation of effective radius R as the pinion rotates in the left turn. By effective radius is meant a radius such that when the pinion is rotated through some small angle A radians, the rack travels a distance $A \times R$. Successively reducing values of effective radius $R_1$, $R_{11}$ and $R_{111}$ occur at positions $4_1$, $4_{11}$ and $4_{111}$.

In order to provide a large effective radius R, it is necessary that the rack tooth gap 5 in the centre position 4 has a large pressure angle B as shown in the projected end view of two adjacent teeth of the rack above the rack. As is well known in the art of skew gears, if a gear of known geometry is meshed with a rack of known pressure angle, then the angle of inclination of the rack teeth T is determined.

Similarly, in order to provide a small effective radius $R_{111}$ at the end of travel, as when the pinion is engaged with the rack tooth gap 7, a small pressure angle $B_{111}$ is required, and the inclination of the rack teeth $T_{111}$ is again determined and will generally be a small angle than T.

As will be seen in FIGS. I and II when the pinion is meshed as centre and at the end of travel as at 4 and $4_{111}$ respectively, the radii R and $R_{111}$ have substantially constant values. However at the intermediate value positions $4_1$ and $4_{11}$, radii $R_1$ and $R_{11}$ are changing, as indicated by the slope of the plot of effective radius.

The pinion positions $4_1$ and $4_{11}$ in FIG. 1 have been chosen to illustrate a unique property of the teeth of the rack, as exemplified here by tooth No. 6. It will be seen that angle $T_1$, the angle of inclination of the rack tooth near its upper edge as at 9 in FIG. 1, its larger than $T_{11}$, the angle of inclination of the teeth near the bottom edge as at 10. It follows that tooth gap 6 is slightly bent from end to end. Further, the pressure angle $B_1$ at the top section is greater than $B_{11}$, the pressure angle at the bottom section, so that the flanks of the teeth are slightly twisted. At any one section, the pressure angle e.g. $B_1$ or $B_{11}$ is constantly changing, so that the working section of the tooth flanks are either convex or concave.

In order to better describe the teeth, it is useful to consider a mean inclination angle $T_{1111}$ which is intermediate between $T_1$ and $T_{11}$ and which joints 9 and 10. Thus $T_{1111}$ indicates the mean inclination of tooth gap 6.

FIG. III is an enlarged end view of tooth gap 6 along the direction $T_{1111}$ in which the sections of the tooth gap on the lines XX, YY and ZZ are shown as dashed, chain dotted and a full line respectively. Because this direction of viewing is at the angle $T_{1111}$ of FIG. 1, it follows that the vertical centrelines passing through points 9 and 10 in planes XX and ZZ respectively are coincident in FIG. 111. Centreline 8 in plane YY is, however, displaced to the left indicating the bent form of this tooth gap. The arrows indicating points on the flanks of the teeth in FIG. III show where the active section of the adjacent teeth flanks terminate and the non-active or root area of the teeth commence.

It will be evident that a reasonable approximation of tooth gap 6 may be made by providing two straight flanks joined, not necessarily tangentially, by a radius as shown in FIG. IV. Such a shape is ideally suited to machining by broaching.

By careful design of this shape, it has been found that it differs from the exact and final shape of no more than 0.007", an amount capable of being deformed in a die made the exact counterpart of the desired finished shape of the teeth. Such forming or cold working is facilitated if there is clearance in the root area of the teeth as preformed, so that there is some place to which excess metal may flow. Alternatively it may be desired to finish the teeth by a machining process, in which case the tooth gap preformed will require to have a shape such as would lie within the envelope of all sections along the tooth flanks so as to permit metal to be removed where required. Such a form is indicated as a series of dots in FIG. 111. The method of preforming will now be described.

It will be recalled that each tooth is of a different shape and differently inclined to the rack axis. However, the respective pairs of progressively remote teeth on opposite sides of a central point of the rack, that is to say a point in the middle of the teeth of the rack, (this will not normally coincide with the centre of the rack as a whole) are at the same angle to the longitudinal axis of the rack, and hence the axes of the preformed shapes of the teeth such as shown in FIG. IV will lie at the same angle to the rack axis in corresponding teeth on each side of the central point. The teeth on opposite sides of the central point are, in this sense, symmetrical.

Therefore, it is possible to arrange a pair of broach blades simultaneously to machine both teeth of each pair of teeth symmetrically placed with respect to the central point of the rack, and to provide a series of such pairs as an array of broach blades along the ram of a broaching machine.

A machine including such an arrangement is shown schematically in FIG. V. Here rack blank 11 is clamped in a work-holding fixture 12 secured to spindle 13 arranged for pivoting about the axis 13a of the spindle 13 in a bracket 14 of the machine base 15. The rack 11 is held in position by clamps 11a which may be as shown, or may be power-operated for improved loading time. The rack is held so that it is at right angles to the axis of the spindle 13 that axis extended passing through the central point of the rack. Lever 16, extending from work-holding fixture 12 has a roller 17 which engages in slot cam 18 in broach slide 19. The latter is arranged to slide axially in machine base 15 in some suitable manner, for example in roller guides 20.

Reciprocation of the broach slide in the base is caused by motor 21 which drives through gearing and a pinion (not shown) a rack 22 secured to the broach slide. On the front along the length of the broach slide are secured pairs of broach blades 23a, 23b, 23c etc., each pair being separated by a gap as at 24a, b, c, etc. It will be seen that each succeeding pair of broach blades after the first is separated vertically by an increasing distance, so as to machine successive pairs of rack teeth more remote from the rack central point.

Lever 16 serves to index work-holding fixture 12 about an axis extending at right angles to the longitudinal axis of the rack blank and hence rack blank 11 about its central point to the angle required for each pair of teeth, and indexes in steps as the broach slide moves according to the steps 25a, b, c, etc. in slot-cam 18. It is arranged that such steps occur when the gaps 24 between the broach blades are opposite rack blank 11 and hence cutting is not occuring, during cutting the angle of which the rack blank is indexed is held constant.

Additional cam means (not shown) on broach slide 19 may be used to clamp spindle 13 securely whilst cutting by each pair of broach blades is in progress, and release said spindle for adjustment to the angle $\psi$ during the period when gap 24 between the pairs of broach blades is opposite the rack 11.

It follows from accepted broaching practice that, on completion of a single pass of the broach slide as, for example, from right to left in FIG. V, that the work-holding fixture 12 and spindle 13 be retracted away from the broach slide during the latter's return stroke. Also provision will be made for the easy loading of the racks by the operator to the work-holding fixture.

There are many possible refinements and variations of the machine which will be evident to those skilled in the art of designing broaching machines.

For example the work-holding fixture 12 may be designed to hold a plurality of rack blanks simultaneously so that teeth may be cut in all blanks at one pass of the broach slide.

While in the machine described which represents the preferred form of the invention the rack blank is held still during tooth cutting and the broaches are traversed past the rack blank, the opposite arrangement may be used in which the rack blanks are traversed past fixed broach blades by the use of techniques used in chain broaching in which each work piece to be broached is mounted on the link of a chain which is moved past a fixed broach blade. Work pieces are loaded on the chain before it passes the broach and removed from it after broaching. In a machine according to the invention constructed in this manner a plurality of pairs of broach blades as described above are provided on a fixed broach carrying member and also on each link of the chains for indexing the rack blanks before each pair of teeth is broached.

Where a number of adjacent pairs of teeth of a rack are at substantially the same angle to the axis of the rack such pairs of teeth may be broached simultaneously by appropriately increasing the number of broach blades in each 'pair'.

I claim:

1. A machine for manufacturing variable ratio steering gear racks having teeth in two groups arranged symmetrically about a central point on the rack, said machine comprising a base, a holding fixture to hold at least one rack blank having a longitudinal axis and indexable about a second axis passing at right angles to the longitudinal axis of the rack blank through said central point of a rack blank held in said fixture, a broach carrying member, a plurality of pairs of broach blades spaced apart at length along said broach carrying member, means for producing relative movement between said broach carrying member and said holding fixture, said pairs of blades being arranged to cut sequentially pairs of corresponding teeth of said groups of teeth simultaneously on the occurrence of said relative movement, means to hold said holding fixture correctly indexed during the cutting of teeth, means to index said holding fixture about said second axis after each pair of corresponding teeth has been cut preparatory to the cutting of a succeeding pair of teeth.

2. A machine as claimed in claim 1 wherein the broach carrying member is slidable in said base and said means for producing relative movement acts to traverse broach blades on said broach carrying member past said holding fixture.

3. A machine as claimed in claim 2 wherein said means to hold the holding fixture correctly indexed during the cutting of teeth and said means to index said holding fixture about said axis comprise a cam track in said broach carrying member, a cam follower in said cam track and means connecting said cam follower to said holding fixture.

* * * * *